(12) United States Patent
Fukase et al.

(10) Patent No.: US 9,019,526 B2
(45) Date of Patent: Apr. 28, 2015

(54) IMAGE EXAMINATION APPARATUS, IMAGE EXAMINATION SYSTEM, AND IMAGE EXAMINATION METHOD

(71) Applicants: Takahiro Fukase, Kanagawa (JP); Tadashi Kitai, Kanagawa (JP)

(72) Inventors: Takahiro Fukase, Kanagawa (JP); Tadashi Kitai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/191,935

(22) Filed: Feb. 27, 2014

(65) Prior Publication Data

US 2014/0268207 A1    Sep. 18, 2014

(30) Foreign Application Priority Data

Mar. 15, 2013  (JP) ................................ 2013-054009
Jan. 9, 2014   (JP) ................................ 2014-002564

(51) Int. Cl.
*G06K 15/00*  (2006.01)
*G06K 15/02*  (2006.01)

(52) U.S. Cl.
CPC ................................. *G06K 15/027* (2013.01)

(58) Field of Classification Search
None
See application file for complete search history.

(56) References Cited

U.S. PATENT DOCUMENTS

| 2011/0134458 | A1  | 6/2011 | Kojima et al. |
| 2012/0121139 | A1  | 5/2012 | Kojima et al. |
| 2013/0044342 | A1* | 2/2013 | Kaneko et al. ............... 358/1.13 |
| 2013/0044347 | A1* | 2/2013 | Kitai et al. .................... 358/1.14 |

FOREIGN PATENT DOCUMENTS

| JP | 10-049680   | 2/1998  |
| JP | 2004-195878 | 7/2004  |
| JP | 2011-112593 | 6/2011  |
| JP | 2011-252886 | 12/2011 |
| JP | 2012-103225 | 5/2012  |
| JP | 2012-108854 | 6/2012  |

* cited by examiner

*Primary Examiner* — Paul F Payer
(74) *Attorney, Agent, or Firm* — Oblon, McClelland, Maier & Neustadt, L.L.P.

(57) ABSTRACT

An image examination apparatus includes a generation unit configured to generate an examination image for examining a read image; an extraction unit configured to extract, from the examination image, multiple reference points used for alignment between the examination and read images; a calculation unit configured to calculate information on misalignment between positions of the reference points and positions corresponding respectively to the reference points in the read image; an excluding unit configured to exclude a reference point from the multiple reference points, based on the information on misalignment; an alignment unit configured to perform alignment between the examination and read images based on the reference points other than the excluded reference point; and an examination unit configured to perform examination for determining whether there is a defect in the read image on the basis of a difference between the read and examination images.

11 Claims, 12 Drawing Sheets

MASTER IMAGE        READ IMAGE (a)   (a)

(a)   (a)

IMAGE EXAMINATION APPARATUS, IMAGE EXAMINATION SYSTEM, AND IMAGE EXAMINATION METHOD

CROSS-REFERENCE TO RELATED APPLICATIONS

The present application claims priority to and incorporates by reference the entire contents of Japanese Patent Application No. 2013-054009 filed in Japan on Mar. 15, 2013 and Japanese Patent Application No. 2014-002564 filed in Japan on Jan. 9, 2014.

BACKGROUND OF THE INVENTION

1. Field of the Invention

The present invention relates to an image examination apparatus, an image examination system, and an image examination method.

2. Description of the Related Art

Prints are conventionally inspected manually, but devices that perform inspection are used recently for post processing of offset printing. When such an inspection device is used, first, a quality item is manually selected and read from among read images of a print to generate a master image. The inspection device then compares the generated master image with a corresponding part of a read image of the print to be inspected and, on the basis of the degree of the difference between the master image and the read image, determines whether there is a defect in the print.

However, plateless printing machines for electrophotography etc. is excel at smaller number of prints and, in many cases, the print contents differ according to each page in variable data printing etc. Thus, it is not efficient to generate a master image to be compared from a print as it is performed for offset printing machines. In order to deal with this problem, it can be considered to generate a master image from print data, which makes it possible to efficiently deal with variable printing.

In order to efficiently examine a read image by comparing it with a master image, alignment for correcting misalignment between the master image and the read image is previously performed. Specifically, alignment is performed in a way that reference points indicating a characteristic part of an image are extracted, the reference points are associated between the master image and the read image, and amounts of misalignment are calculated from the differences between the master image and the read image.

There is also a proposed method where an image is divided into predetermined areas and amounts of misalignment of the respective divided areas are calculated in order to analyze the tendency of the amount of misalignment over the image (see Japanese Patent Application Laid-open No. 2011-112593). There is another proposed method where an image is divided into predetermined areas and an amount of misalignment calculated for each of the divided areas is compared with an amount of misalignment of a whole image in order to calculate the amount of misalignment over the image (see Japanese Patent Application Laid-open No. 2011-252886).

However, when a read image has a print defect occurring in a position serving as a reference point or has the same repeated pattern, it is difficult to find reference points corresponding to those of the master image, which may results in a failure in alignment using reference points. According to Japanese Patent Application Laid-open No. 2011-112593 and Japanese Patent Application Laid-open No. Japanese Patent Application Laid-open No. 2011-252886, a failure in such alignment is not taken into consideration. In other words, when such a failure in alignment occurs, the amount of misalignment of each divided area is miscalculated, which results in erroneous alignment.

Therefore, there is provided a need to prevent, when examining a read image by comparing it with a master image, a failure in alignment between the read image and the master image.

SUMMARY OF THE INVENTION

It is an object of the present invention to at least partially solve the problems in the conventional technology.

According to an embodiment, there is provided an image examination apparatus that includes a read image acquisition unit configured to acquire a read image that is generated by reading an image formed on a recording medium; an examination image generation unit configured to generate an examination image for examining the read image on the basis of information on the image that is to be formed and output; a reference point extraction unit configured to extract, from the generated examination image, multiple reference points that are used as references for alignment between the examination image and the read image; a misalignment information calculation unit configured to calculate information on misalignment between positions of the reference points extracted from the examination image and positions corresponding respectively to the reference points in the read image; a reference point excluding unit configured to exclude a reference point to be excluded from the multiple reference points, on the basis of the calculated information on misalignment; an alignment unit configured to perform alignment between the examination image and the read image on the basis of the reference points other than the excluded reference point; and an image examination unit configured to perform examination for determining whether there is a defect in the read image on the basis of a difference, used for the alignment, between the read image and the examination image.

According to another embodiment, there is provided an image examination system that includes a read image acquisition unit configured to acquire a read image that is generated by reading an image formed on a recording medium; an examination image generation unit configured to generate an examination image for examining the read image on the basis of information on the image that is to be formed and output; a reference point extraction unit configured to extract, from the generated examination image, multiple reference points that are used as references for alignment between the examination image and the read image; a misalignment information calculation unit configured to calculate information on misalignment between positions of the reference points extracted from the examination image and positions corresponding respectively to the reference points in the read image; a reference point excluding unit configured to exclude a reference point to be excluded from the multiple reference points, on the basis of the calculated information on misalignment; an alignment unit configured to perform alignment between the examination image and the read image on the basis of the reference points other than the excluded reference point; and an image examination unit configured to perform examination for determining whether there is a defect in the read image on the basis of a difference, used for the alignment, between the read image and the examination image.

According to still another embodiment, there is provided an image examination method that includes acquiring a read image that is generated by reading an image formed on a recording medium; generating an examination image for examining the read image on the basis of information on the image that is to be formed and output; extracting, from the generated examination image, multiple reference points that are used as references for alignment between the examination image and the read image; calculating information on misalignment between positions of the reference points extracted from the examination image and positions corresponding respectively to the reference points in the read image; excluding a reference point to be excluded from the multiple reference points, on the basis of the calculated information on misalignment; performing alignment between the examination image and the read image on the basis of the reference points other than the excluded reference point; and performing examination for determining whether there is a defect in the read image on the basis of a difference, used for the alignment, between the read image and the examination image.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
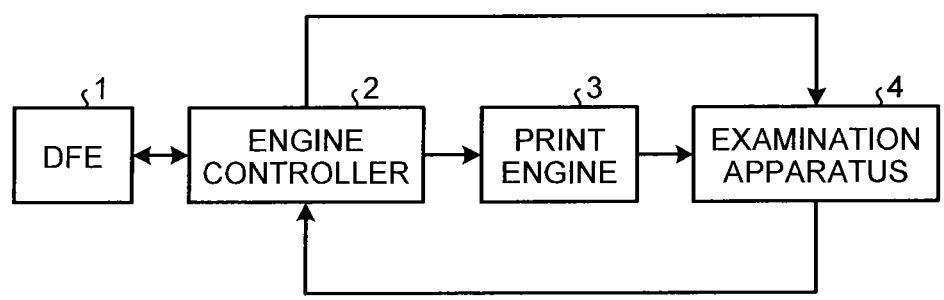
FIG. 1 is a diagram of a configuration of an image forming system that includes an examination apparatus according to an embodiment of the present invention.

An embodiment of the present invention will be described in detail below with reference to the accompanying drawings. The embodiment is characterized in a configuration where an image examination system that includes an examination apparatus that examines an output result by comparing a read image, obtained by reading the output result as a result of forming and outputting an image, with a master image performs accurate alignment of each divided area. FIG. 1 is a diagram of an overall configuration of the image forming system according to the embodiment. As illustrated in FIG. 1, the image forming system according to the embodiment includes a DFE (digital front end) 1, an engine controller 2, a print engine 3, and an examination apparatus 4.

The DFE 1 generates image data that should be output by print in accordance with a received print job, i.e., bit-map data that is an image to be output, and outputs the generated bit-map data to the engine controller 2. The engine controller 2 controls the print engine 3 in accordance with the bit-map data that is received from the DFE 1 to cause the print engine 3 to form and output an image. The engine controller 2 according to the embodiment transmits, to the examination apparatus 4, the bit-map data received from the DFE 1 as original information of an examination image that will be to be referred when the examination apparatus 4 examines the result of forming and outputting of the image performed by the print engine 3.

The print engine 3 is an image forming apparatus that, under the control of the engine controller 2, forms and outputs an image on paper that is a recording medium in accordance with bit-map data. In addition to paper, any sheet materials that is made of, for example, film or plastic, and to which a formed image can be output may be used as recording media. The examination apparatus 4 generates a master image in accordance with the bit-map data that is input from the engine controller 2. The examination apparatus 4 is an image examination apparatus that examines an output result by comparing, with the master image, a read image that is generated by reading the paper output by the print engine 3, using the reading device.

According to the comparison between the master image and the read image, upon determining that there is a defect in the output result, the examination apparatus 4 notifies the engine controller 2 of information indicating the page that has been identified as a defect. Accordingly, the engine controller 2 controls re-printing of the page with a defect.

Figure 2:
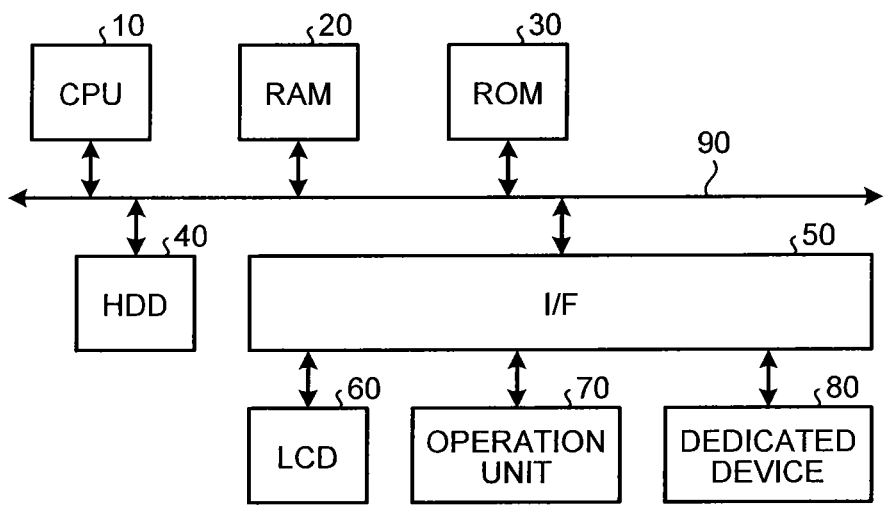
FIG. 2 is a block diagram of a hardware configuration of the examination apparatus according to the embodiment of the present invention.

The hardware configuration constituting a functional block of the engine controller 2, the print engine 3, and the examination apparatus 4 according to the embodiment will be described with reference to FIG. 2. FIG. 2 is a block diagram of a hardware configuration of the examination apparatus 4 according to the embodiment. FIG. 2 illustrates the hardware configuration of the examination apparatus 4, and the engine controller 2 and the print engine 3 has the same hardware configuration as that of the examination apparatus 4.

As illustrated in FIG. 2, the examination apparatus 4 according to the embodiment has the same configuration as that of an information processing apparatus, such as a normal PC (Personal Computer) or a server. In other words, the examination apparatus 4 according to the embodiment includes a CPU (Central Processing Unit) 10, a RAM (Random Access Memory) 20, a ROM (Read Only Memory) 30, an HDD (Hard Disk Drive) 40, and an I/F 50 that are connected via a bus 90. Furthermore, an LCD (Liquid Crystal Display) 60, an operation unit 70, and a dedicated device 80 are connected to the I/F 50.

The CPU 10 is a computer that controls whole operations of the examination apparatus 4. The RAM 20 is a volatile storage medium to and from which information can be written and read at high speed and that can be used as an operation area for the CPU 10 to process information. The ROM 30 is a read-only non-volatile storage medium in which programs such as firmware are stored. The HDD 40 is an information-readable non-volatile storage medium to and from which information can be written and read and in which an OS (Operating System) and various control programs and application programs etc. are stored.

The I/F 50 controls connection of the bus 90 with various types of hardware, the network, etc. The LCD 60 is a visual user interface for a user to check the state of the examination apparatus 4. The operation unit 70 is a user interface, such as a keyboard, a mouse, etc. for a user to input information to the examination apparatus 4.

The dedicated device 80 is hardware for implementing dedicated functions in the engine controller 2, the print engine 3, and the examination apparatus 4. For the print engine 3, the dedicated device 80 serves as a transfer mechanism for transferring paper to which a formed image is to be output and a plotter device that forms and outputs an image on paper. For the case of the engine controller 2 or the examination apparatus 4, the dedicated device 80 serves as a dedicated computer for processing images at high speed. Such a computer is configured as an ASIC (Application Specific Integrated Circuit) and further includes a reading device that reads an image that is output to paper.

With such a hardware configuration, programs that are stored in the ROM 30 and the HDD 40, or a recording medium (not illustrated) such as an optical disk, is loaded to the RAM 20 and the CPU 10 performs operations according to those programs so that a software controller is configured. The combination of the software controller that is configured as described above and the hardware configures the functional block that implements the functions of the engine controller 2, the print engine 3, and the examination apparatus 4 according to the embodiment.

Figure 3:
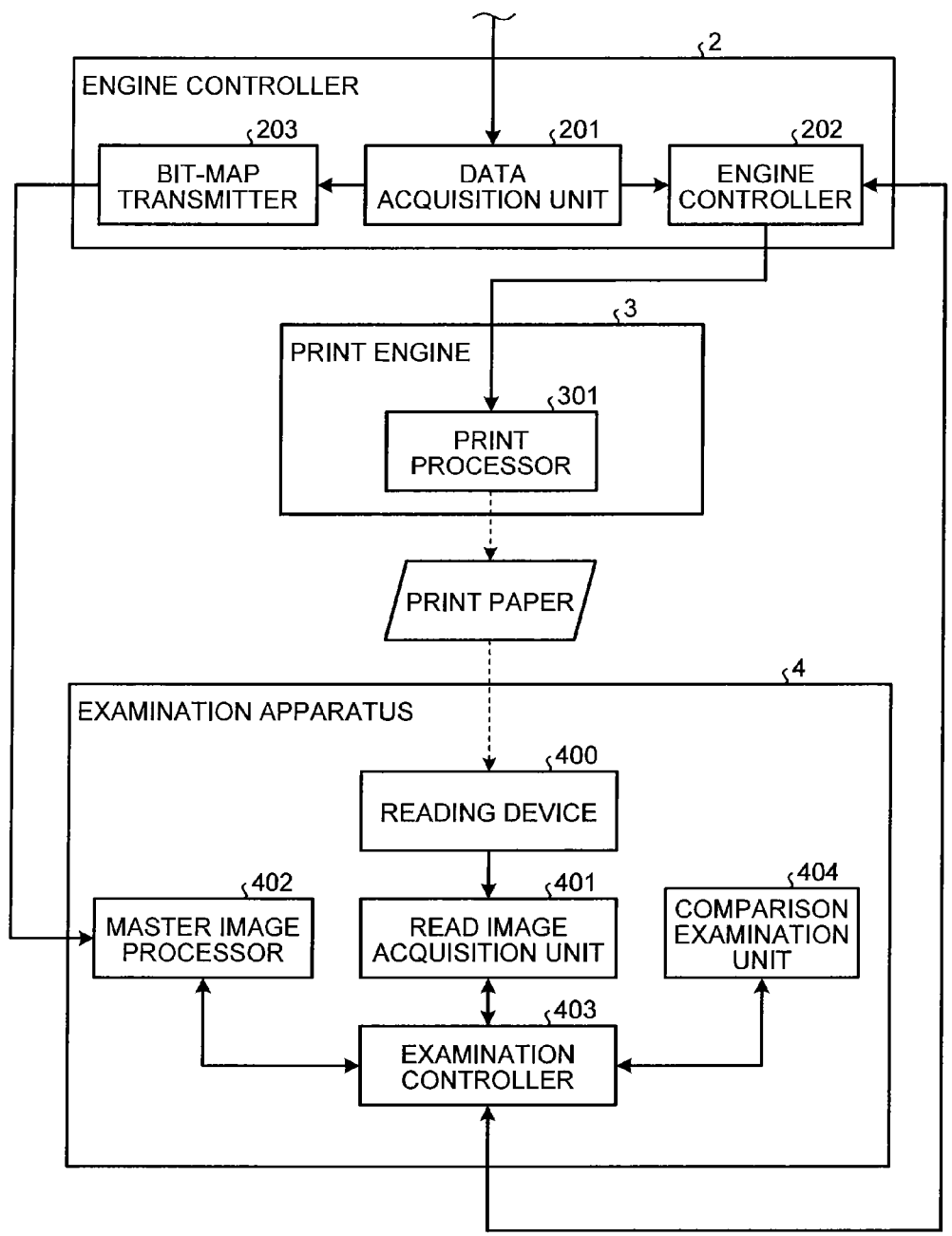
FIG. 3 is a block diagram of a functional configuration of an engine controller, a print engine, and the examination apparatus according to the embodiment of the present invention.

FIG. 3 is a block diagram of the functional configuration of the engine controller 2, the print engine 3, and the examination apparatus 4 according to the embodiment. In FIG. 3, the solid lines denote data transmission/reception and the dotted lines denote the flow of paper. As illustrated in FIG. 3, the engine controller 2 according to the embodiment includes a data acquisition unit 201, an engine controller 202, and a bit-map transmitter 203. The print engine 3 includes a print processor 301. The examination apparatus 4 includes a reading device 400, a read image acquisition unit 401, a master image processor 402, an examination controller 403, and a comparison examination unit 404.

The data acquisition unit 201 acquires bit-map data that is input from the DFE 1 and the engine and causes the engine controller 202 and the bit-map transmitter 203 to operate. The bit-map data is information on pixels constituting an image that should be formed and output. The data acquisition unit 201 functions as a pixel information acquisition unit. The engine controller 202 causes the print engine 3 to form and output an image on the basis of the bit-map data that is transferred from the data acquisition unit 201. The bit-map transmitter 203 transmits the bit-map data acquired by the data acquisition unit 201 to the examination apparatus 4 in order to generate a master image.

The print processor 301 acquires the bit-map data that is input from the engine controller 2 and forms an image and outputs the image to print paper and outputs the printed paper. The print processor 301 according to the embodiment is achieved by using a general electrophotographic image forming mechanism. Alternatively, an ink-jet image forming mechanism may be used.

The reading device 400 is an image reading unit that reads the image that is formed on the printed paper output by the print processor 301 and outputs the read data. The reading device 400 is, for example, a line scanner, set on a transfer route in the examination apparatus 4, for reading the image formed on the paper surface of the printed paper, output by the print processor 301, by scanning the paper surface of the transferred printed paper.

The read image generated by the reading device 400 is to be examined by the examination apparatus 4. The read image is an image that is generated by reading the paper surface of the output paper, thus indicating the output result.

The read image acquisition unit 401 acquires information on the read image that is read and generated by the reading device 400. The information on the read image acquired by the read image acquisition unit 401 is input to the comparison examination unit 404 for comparison examination. The read image is input to the comparison examination unit 404 under the control of the examination controller 403. The examination controller 403 acquires the read image and then inputs the read image to the comparison examination unit 404.

As described above, the master image processor 402 acquires bit-map data that is input from the engine controller 2 and generates a master image that is an examination image to be compared with the image to be examined. In other words, the master image processor 402 functions as an examination image generator that generates, on the basis of the output target image, a master image that is an examination image used to examine the read image.

The information on the master image that is generated by the master image processor 402 is input to the comparison examination unit 404 for comparison examination. The master image is input to the comparison examination unit 404 under the control of the examination controller 403. Specifically, the examination controller 403 acquires the master image and then inputs the master image to the comparison examination unit 404.

The examination controller 403 is a controller that controls whole operations of the examination apparatus 4 and the components of the examination apparatus 4 operate under the control of the examination controller 403.

The comparison examination unit 404 compares the read image that is acquired by the read image acquisition unit 401 with the master image that is generated by the master image processor 402 and determines whether an intended image has been formed and output. The comparison examination unit 404 is configured by using an ASIC, such as that described above, for processing a huge amount of calculation speedily.

In other words, the examination controller 403 controls the comparison examination unit 404, thereby functioning as an image examination unit.

The comparison examination unit 404 compares a 200-dpi read image expressed by 8-bit RGB colors with the master image on a pixel-by-pixel basis and calculates a value of difference in pixel value of 8-bit RGB colors on a pixel-by-pixel basis. On the basis of the magnitude relations each between a difference value calculated as described above and a threshold, the examination controller 403 determines whether there is a defect in the read image.

Figure 4:
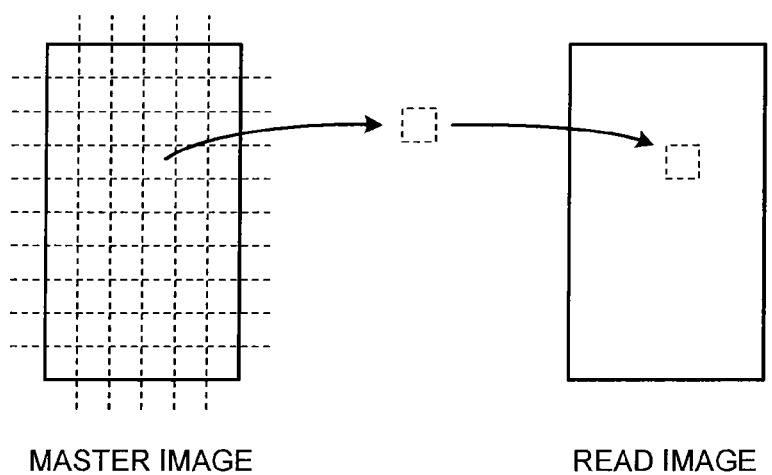
FIG. 4 is a diagram of a mode of comparison examination according to the embodiment of the present invention.

When comparing the read image with the master image, as illustrated in FIG. 4, the comparison examination unit 404 superimposes each given divided area of the master image onto the read image corresponding to the divided area to calculate a difference in pixel value, i.e. concentration, on a pixel-by-pixel basis. Furthermore, while vertically and horizontally shifting the position where a divided area is superimposed onto the read image, a position where the calculated difference value is minimum is determined as a position for accurate superimposition and the calculated difference values at the position are used as a result of comparison. According to such processing, difference values between the aligned read and master images are calculated.

Furthermore, when difference values are calculated for each of divided areas, instead of calculating difference values between a whole read image and a whole mater image superimposed on the read image, and the results of comparison that are difference values calculated for an area are used to calculate difference values in a divided area neighboring the area, the amount of vertically and horizontally shifting the image can be reduced, which thus reduces the total volume of calculation. Furthermore, even if there is a difference in scale between the whole master image and the whole read image, the effects of the scale difference can be reduced by performing alignment for each of the divided area illustrated in FIG. 4.

As a method of making comparison in magnitude between a difference value and the threshold, the examination controller 403 according to the embodiment compares, with the pre-set threshold, each of the difference values that are calculated for the respective pixels by the comparison examination unit 404. Accordingly, the examination controller 403 acquires, as a comparison result, information indicating whether the difference between the master image and the read image exceeds a predetermined threshold on a pixel-by-pixel basis. In other words, for each of pixels constituting the read image, it can be examined whether there is a defect. Furthermore, the size of each of the divided areas illustrated in FIG. 4 is determined on the basis of an area for which the comparison examination unit 404, which is configured by using an ASIC as described above, can make comparison in pixel value at once.

The above-described embodiment takes an exemplary case where the comparison examination unit 404 calculates and outputs a difference value between a pixel constituting the master image and a pixel constituting the read image and the examination controller 403 compares the difference value with the threshold. Alternatively, the comparison examination unit 404 may compare a difference value with a threshold and the examination controller 403 may acquire information on whether the comparison result, i.e., a difference between each pixel constituting the read image and a corresponding pixel of the master image, exceeds the given threshold.

Figure 5:
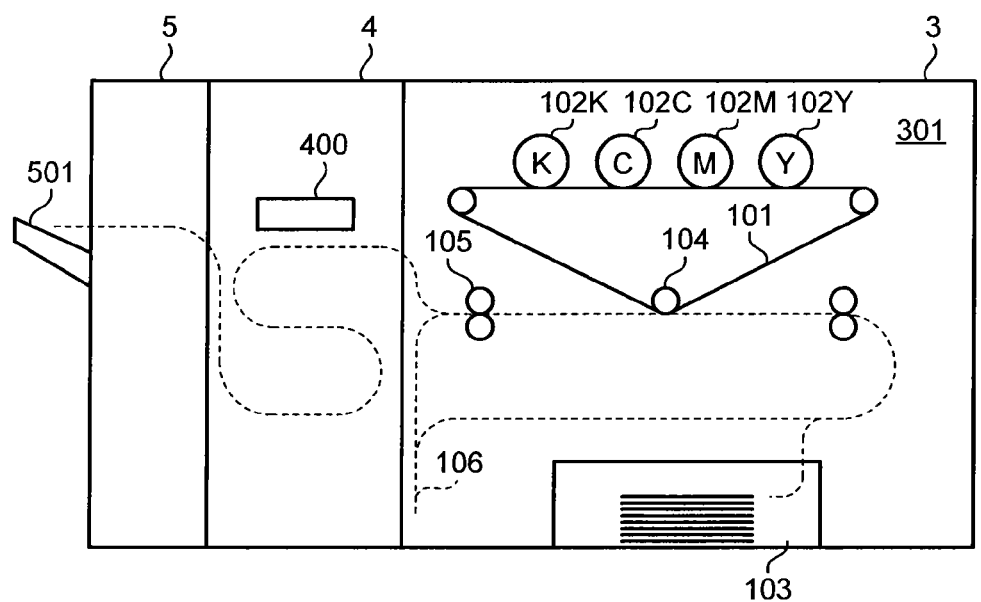
FIG. 5 is a diagram of a configuration of the print engine, the examination apparatus, and a stacker according to the embodiment of the present invention.

The mechanical configuration of the print engine 3, the examination apparatus 4, and the stacker 5 and the paper transfer route will be described with reference to FIG. 5. As illustrated in FIG. 5, the print processor 301 of the print engine 3 is a so-called tandem print processor configured to include photosensitive drums 102Y, 102M, 102C and 102K (hereinafter, generally "photosensitive drum 102"), corresponding to respective colors, that are arranged along a transfer belt 101 serving as an endless moving unit. In other words, along the transfer belt 101 that is an intermediate transfer belt on which an intermediate transfer image to be transferred onto the paper (an example of recording medium) fed from a paper feeding tray 103 is formed, the multiple photosensitive drums 102Y, 102M, 102C, and 102K are arranged from the upstream side of the transfer belt 101 in the transfer direction.

Images of the respective colors developed by using toner on the surfaces of the photosensitive drums 102 of the respective colors are superimposed on the transfer belt 101 and transferred thereto, thereby a full-color image is formed. The function of a transfer roller 104 makes it possible to transfer the full-color image, which that is formed on the transfer belt 101 as described, onto the surface of the paper, which has been transferred on the route, in the most adjacent position to the paper transfer route denoted by the dotted line in FIG. 5.

The paper on which the image is formed is further transferred, a fixing roller 105 fixes the image thereon, and then the paper is transferred to the examination apparatus 4. For double-sided printing, the paper with one side on which an image is formed and fixed is then transferred to an inversion path 106, is inverted, and is then re-transferred to the transfer position on the transfer roller 104.

The reading device 400 reads each of both sides of the paper having been transferred from the print processor 301 on the paper transfer route in the examination apparatus 4, generates a read image, and outputs the read image to the read image acquisition unit 401 that is configured by using the information processing device in the examination apparatus 4. The paper whose surface has been read by the reading device 400 is further transferred in the examination apparatus 4, is transferred to the stacker 5, and ejected to an ejected-paper tray 501. FIG. 5 illustrates an exemplary case where the reading device 400 is provided only on one side of the paper in the paper transfer route in the examination apparatus 4. Alternatively, the reading devices 400 may be provided on both sides of the paper in order for examination on both sides of paper.

Figure 6:
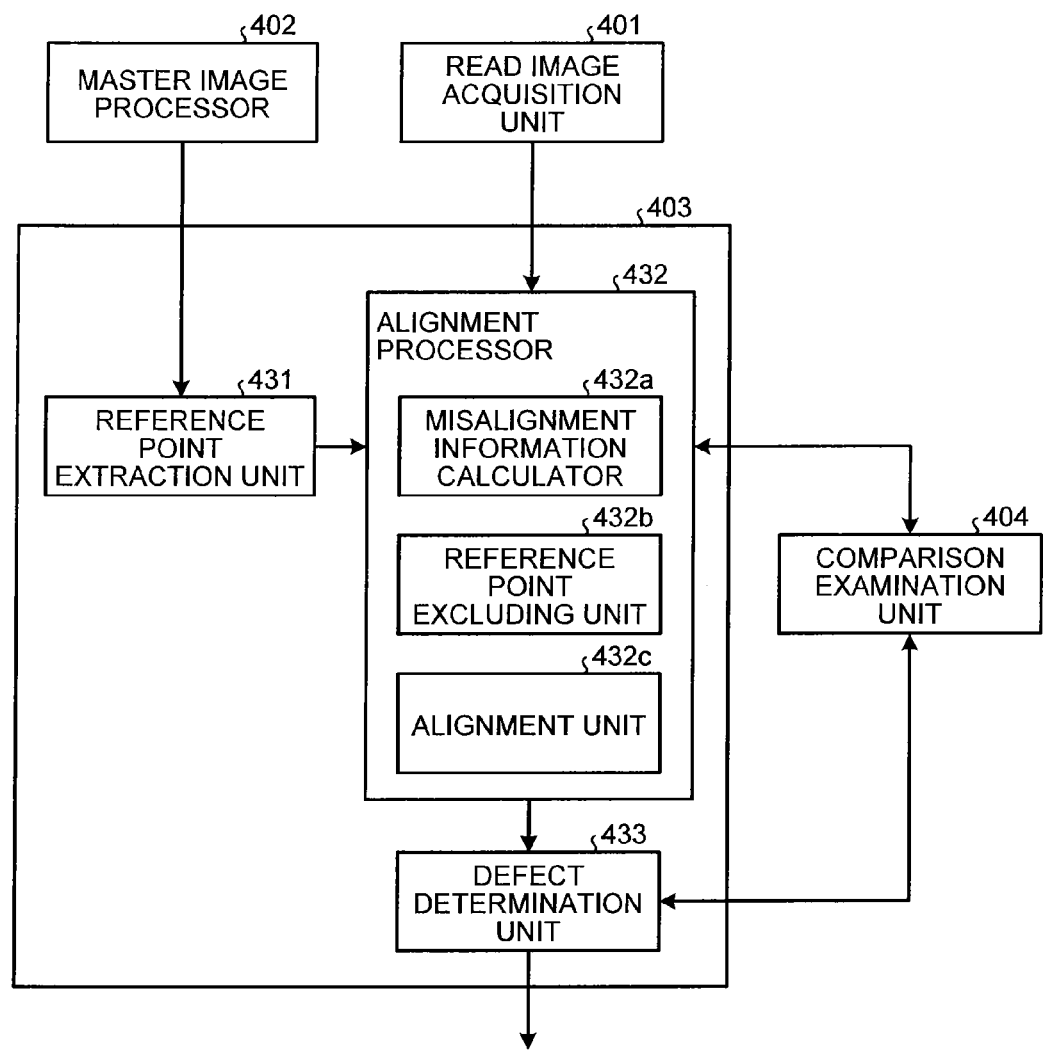
FIG. 6 is a block diagram of a functional configuration of an examination controller according to the embodiment of the present invention.

The outline of the embodiment with such a configuration is in that accurate alignment is performed for each divided area. A functional configuration of the examination controller 403 according to the embodiment will be described as a configuration according to the outline of the embodiment. FIG. 6 is a block diagram of a functional configuration of the examination controller 403 according to the embodiment. As illustrated in FIG. 6, the examination controller 403 according to the embodiment includes an alignment processor 432 and a defect determination unit 433. The alignment processor 432 includes a misalignment information calculator 432a, a reference point excluding unit 432b, and an alignment unit 432c.

Figure 7:
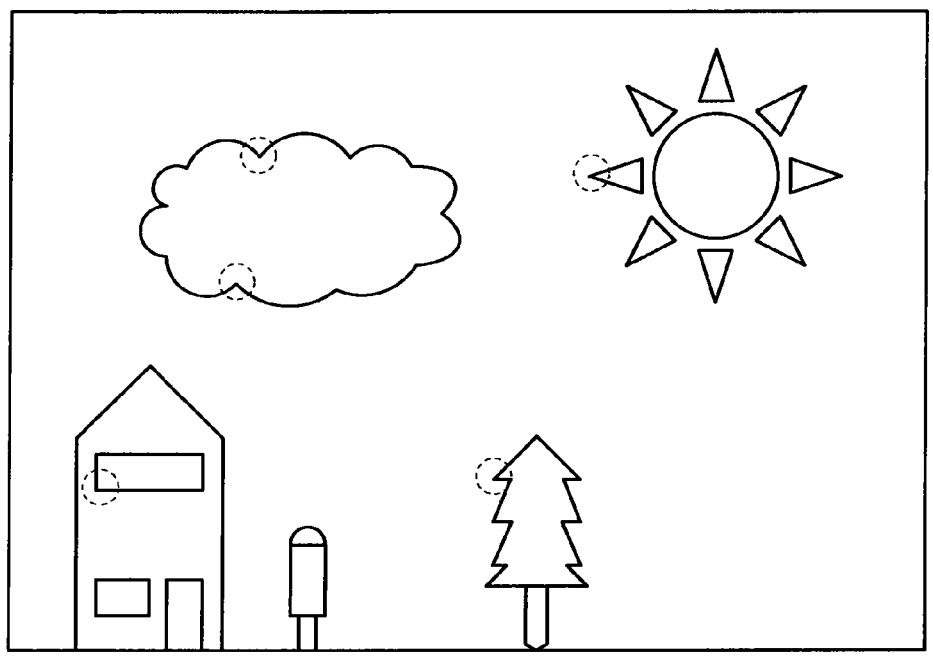
FIG. 7 is a diagram of a mode of extraction of reference points in an image according to the embodiment of the present invention.

A reference point extraction unit 431 divides the master image that is input from the master image processor 402 into given areas and extracts multiple reference points serving as references for alignment from each of the divided areas. A reference point indicates a characteristic pixel in the master image. For example, in the image illustrated in FIG. 7, the reference points includes the tip of a rectangle surrounded with a dotted circle and constituting the sun, a tipped part showing leafs of a tree, etc. Such reference points are extracted by using an image filter, such as a corner extraction filter.

Figure 8:
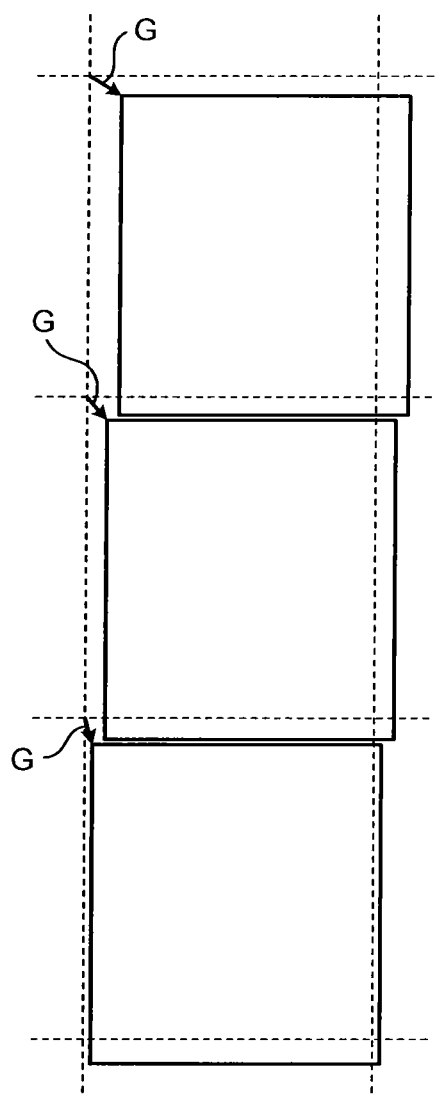
FIG. 8 is a diagram of a mode of alignment according to the embodiment of the present invention.

On the basis of the multiple reference points that are extracted from each of the divided areas of the master image and that are input from the reference point extraction unit 431, the alignment processor 432 calculates, for each of the divided areas, an amount G of misalignment illustrated in FIG. 8 between the master image that is input from the reference point extraction unit 431 and the read image that is input from the read image acquisition unit 401.

The defect determination unit 433 inputs the master image and the read image that are input from the alignment processor 432 to the comparison examination unit 404 and determines whether there is a defect on the basis of the difference values that are calculated by the comparison examination unit 404 according to the processing described with reference to FIG. 4. When extracting an image of an area to examined from each of the master image and the read image and inputting the images to the comparison examination unit 404, the defect determination unit 433 extracts images of the area to be examined from the master image and the read image in consideration for the amounts of misalignment of the respective divided areas that are calculated by the alignment processor 432.

In other words, when extracting an area of the read image corresponding to one area to be examined in the master image having been divided as illustrated in FIG. 4, the defect determination unit 433 according to the embodiment extracts an image from the read image in consideration of the amount of misalignment that is calculated by the alignment processor 432. Accordingly, when performing comparison examination while vertically and horizontally shifting the extraction area as described with reference to FIG. 4, because the comparison examination unit 404 starts comparison examination in a state where the master image and the read image have been already aligned, calculation can be performed using properly-aligned master and read images with a relatively small number of calculations.

Figure 9:
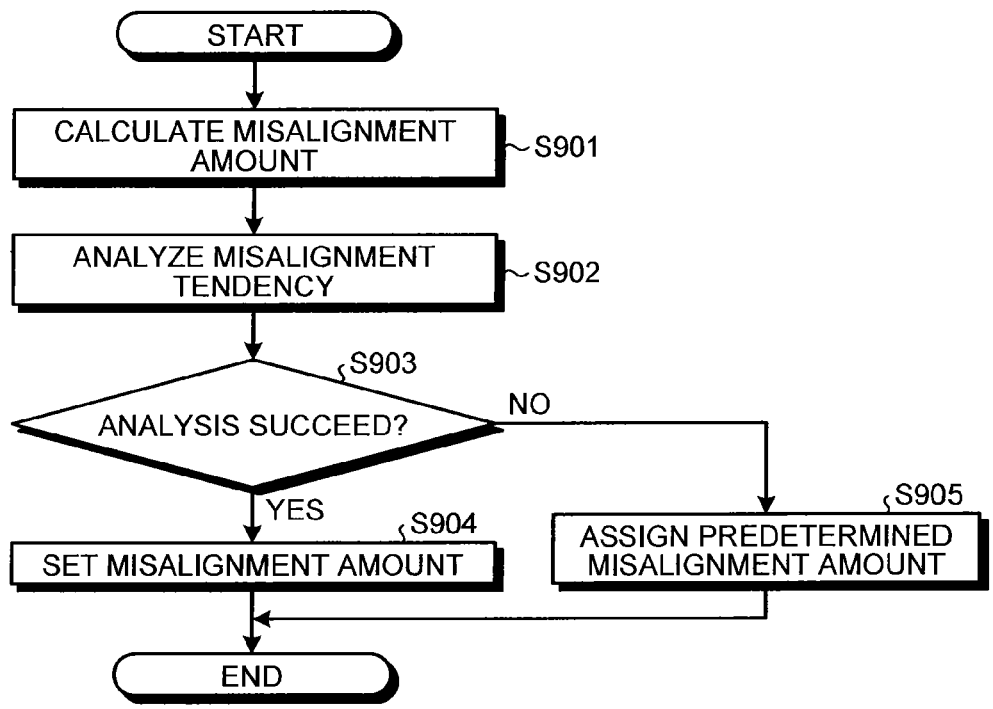
FIG. 9 is a flowchart of a misalignment amount setting process according to the embodiment of the present invention.

A misalignment amount setting process performed by the alignment processor 432 according to the embodiment will be described here. FIG. 9 is a flowchart illustrating the misalignment amount setting process performed by the alignment processor 432. The flowchart of FIG. 9 represents the process for setting an amount of misalignment of each divided area and the process of the flowchart of FIG. 9 is repeated until the setting process for all of the divided areas finishes. As illustrated in FIG. 9, the misalignment information calculator 432a of the alignment processor 432 to which the reference point extraction unit 431 have input the multiple reference points extracted from each of the divided areas of the master image calculates an amount of misalignment of each of the multiple reference points contained in one divided area as misalignment information (S901).

Specifically, the misalignment information calculator 432a extracts an image of a given area surrounding the reference points extracted from the master image, extracts, from the read image, an image in a position corresponding to the image of the given area that is extracted from the master image, and then inputs those images to the comparison examination unit 404 in order to acquire values of difference in pixel value between the images.

While the misalignment information calculator 432a vertically and horizontally shifts an area of an image to be extracted from the read image, the comparison examination unit 404 repeats the process for acquiring the result of calculating a difference value for multiple times and determines, as a position corresponding to the extraction area of the master image, an extraction area of the read image where the total value of the difference values is minimum. The amount of misalignment between the extraction area of the read image determined as described above and the extraction area of the master image is determined as an amount of misalignment of the reference point corresponding to that image.

Figure 10:
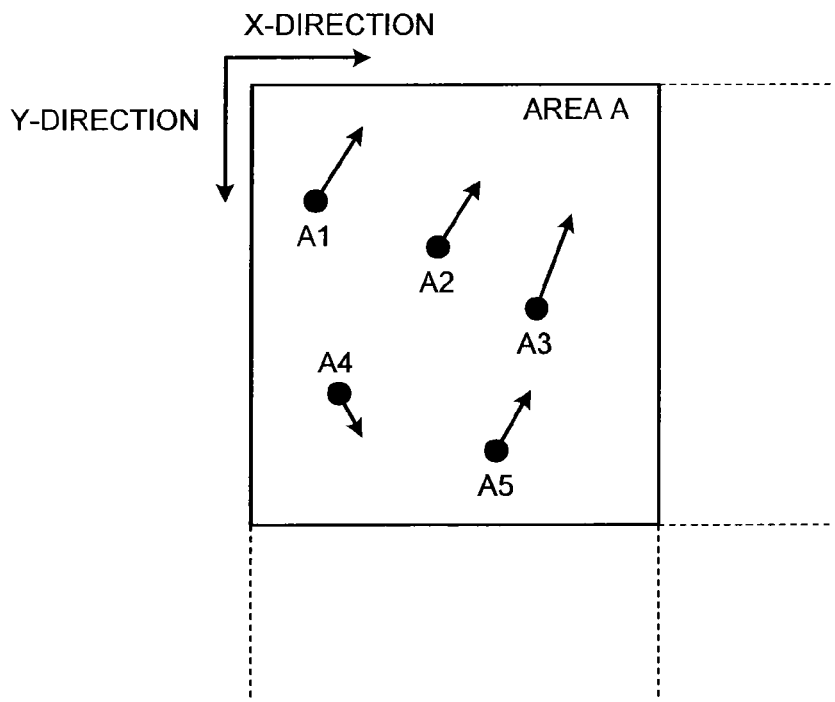
FIG. 10 is a diagram of results of calculation of amounts of misalignment of respective reference points contained in a divided area according to the embodiment of the present invention.
Figure 11:
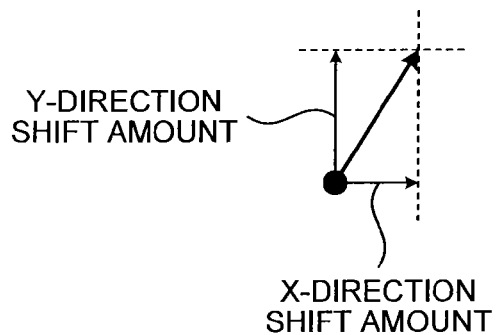
FIG. 11 is a diagram of a mode of expression of an amount of misalignment according to the embodiment of the present invention.

FIG. 10 is a diagram illustrating results of calculation of amounts of misalignment of respective reference points contained in a divided area A of the image. As illustrated in FIG. 10, the divided area A contains reference points A1 to A5 and the arrows extending from the respective reference points denote vectors (direction and magnitude of shift) of misalignment. In other words, the positions of the reference points in the read image are shifted to the tips of the arrows with respect to the reference points of the master image. As illustrated in FIG. 11, a misalignment amount is expressed by an amount of vertical and horizontal misalignment, i.e., misalignment in the Y and X directions, between a master image and a read image.

Once the amounts of misalignment of the respective reference points are calculated, the reference point excluding unit 432b of the alignment processor 432 performs a misalignment tendency analysis of the divided area for which the misalignment amounts have been calculated and determines a reference point(s) that should be excluded from the multiple reference points (S902). A specific exemplary misalignment tendency analysis will be described below with reference to FIG. 12. The misalignment tendency analysis is an analysis of a tendency of the direction and magnitude of vectors indicative of misalignment amounts calculated for a divided area.

In the divided area A illustrated in FIG. 10, while the reference points A1 to A3 and A5 are shifted upward to the right with a similar magnitude, only the reference point A4 is shifted downward to the right with a smaller magnitude than that of the other reference points. From that, it can be understood that the divided area A has a tendency of upward shift to the right in the magnitude shown for the reference points A1 to A3 and A5 and thus the reference point A4 that is out of the tendency is excluded from the reference points.

As described above, the reference point that should be excluded from the reference points contained in the divided are is determined and the misalignment tendency analysis succeeds (YES at step S903), the alignment unit 432c sets a misalignment amount of the divided area from the remaining reference points according to the misalignment tendency analysis (S904). Specifically, the alignment unit 432c assigns, to the amount of misalignment of the divided area, the average of the misalignment amounts of the remaining reference points.

For example, regarding the divided area A illustrated in FIG. 10, the alignment unit 432c assigns, to the amount of misalignment of the divided area A, the average of the misalignment amounts of the reference points A1 to A3 and A5. Instead of calculating an average as described above, the alignment unit 432c may assigns, to the amount of misalignment of the divided area, the misalignment amount of the reference point that satisfies a pre-determined condition (e.g., the closest to the edge of the paper) from among the remaining reference points.

In contrast, when the misalignment tendency analysis fails (NO at step S903) because, for example, the misalignment tendency is not specified, the alignment unit 432c assigns a predetermined misalignment amount to the misalignment amount of the divided area (S905). Alternatively, the alignment unit 432c may assign, to the misalignment amount of the divided area, the misalignment amount of any one of the reference points contained in the divided area or may set the misalignment amount of the divided area on the basis of the tendency of a neighboring area that will be described in detail below.

Figure 12:
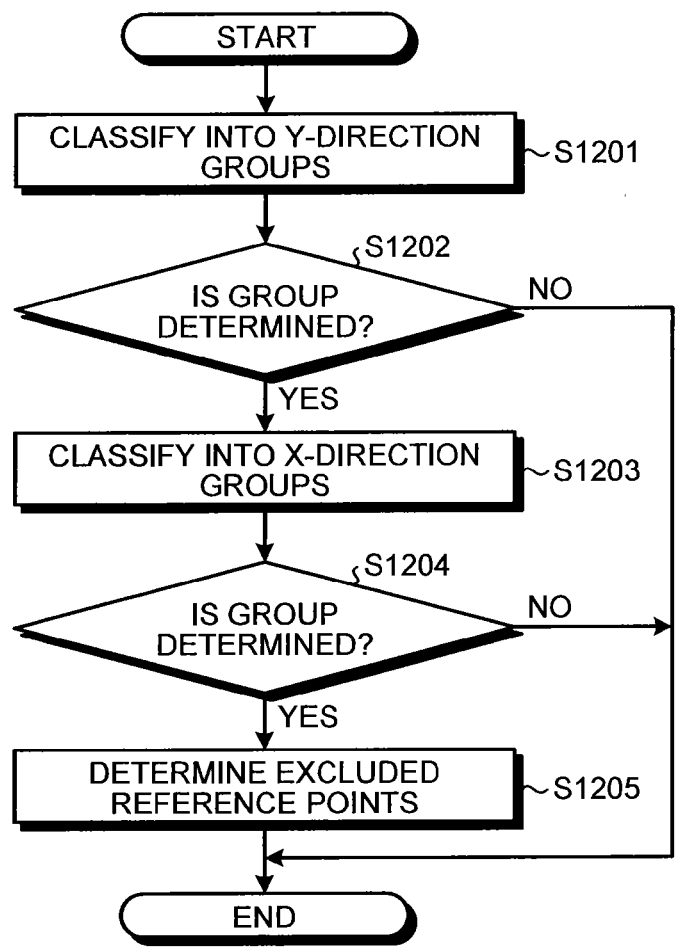
FIG. 12 is a flowchart of a misalignment tendency analysis process according to the embodiment of the present invention.

A specific exemplary misalignment tendency analysis performed by the reference point excluding unit 432b will be described with reference to FIG. 12. FIG. 12 is a flowchart of a misalignment tendency analysis process performed by the reference point excluding unit 432b. Once the misalignment amounts of the respective reference points are calculated, as illustrated in FIG. 12, the reference point excluding unit 432b classifies the reference points into groups on the basis of the amounts of misalignment in the Y direction (S1201) (this will be described in detail below with reference to FIG. 13). Once a group that is an assembly including reference points along the Y-direction misalignment tendency of the divided area is determined (i.e., the Y-direction misalignment tendency analysis succeeds) (YES at S1202), the reference point excluding unit 432b classifies the reference points into groups on the basis of amounts of misalignment in the X-direction by performing the similar process as that for Y-direction misalignment analysis (S1203).

When a group including the reference points along the X-direction misalignment tendency of the divided area is determined (i.e., the X-direction misalignment tendency analysis succeeds) (YES at S1204), the reference point excluding unit 432b determines, as excluded reference points that are excluded from the reference points extracted from the divided area, reference points other than the reference points that belong to both of the group that is determined on the basis of the Y-direction misalignment amounts and the group that is determined on the basis of the X-direction misalignment amounts (S1205). In other words, according to this process, the reference points out of the misalignment tendency of the divided area are excluded from the reference points extracted from the divided area.

When a group including the reference points along the misalignment tendency of the divided area is not determined (NO at S1202 or NO at S1204), the reference point excluding unit 432b determines that the misalignment tendency analysis fails and thus ends the process.

Figure 13:
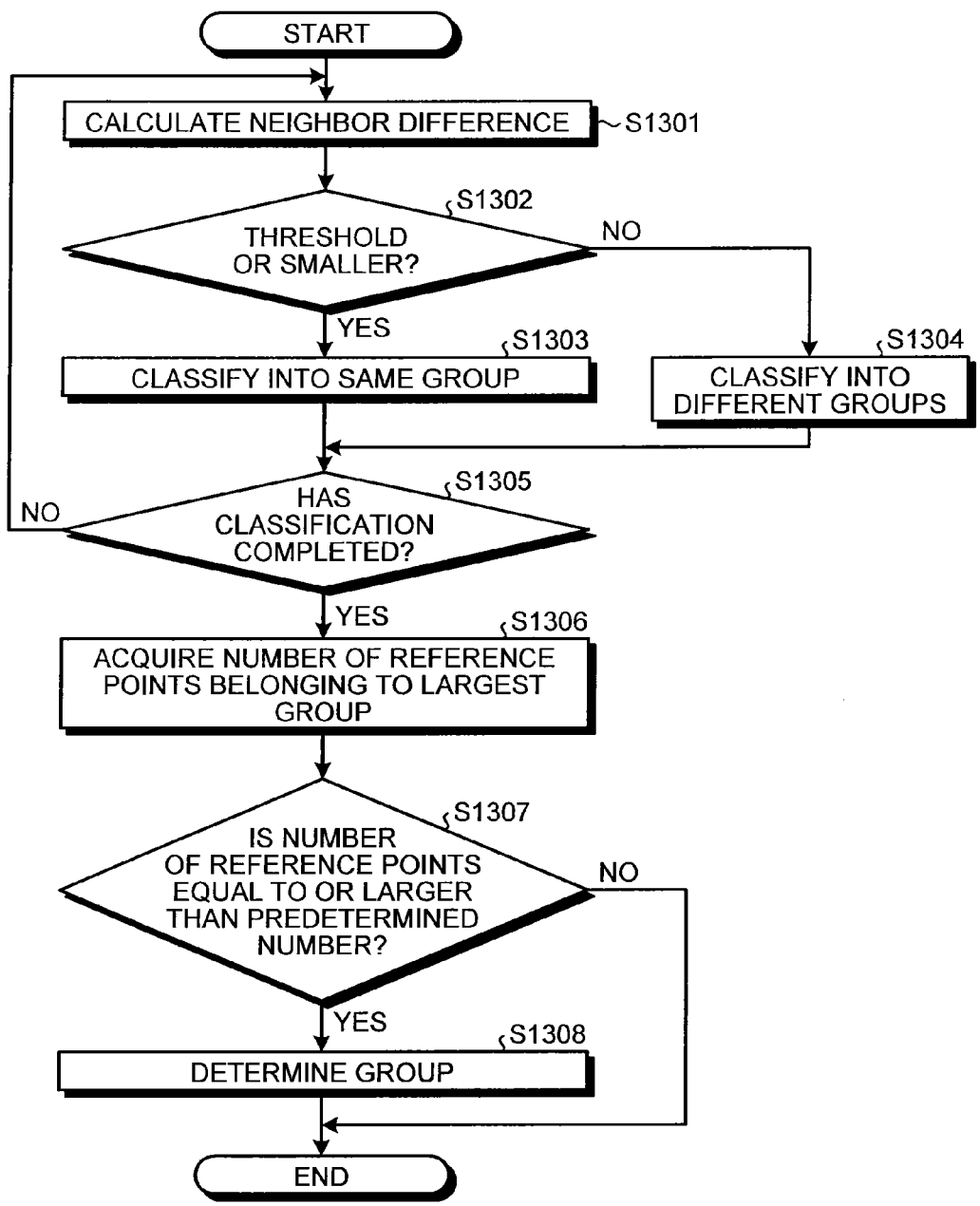
FIG. 13 is a flowchart of a process for classifying reference points into groups according to the embodiment of the present invention.

FIG. 13 is an exemplary flowchart of classifying reference points into groups on the basis of the Y-direction misalignment amounts at S1201 and X-direction misalignment amounts at S1203. With reference to FIG. 13, an exemplary case will be described below where the reference points are classified into groups on the basis of the Y-direction misalignment amounts. Once the Y-direction misalignment amounts of the respective points are acquired, the reference point excluding unit 432b calculates a neighbor difference between the acquired Y-direction misalignment amounts, which will be described below (S1301).

Figure 14:
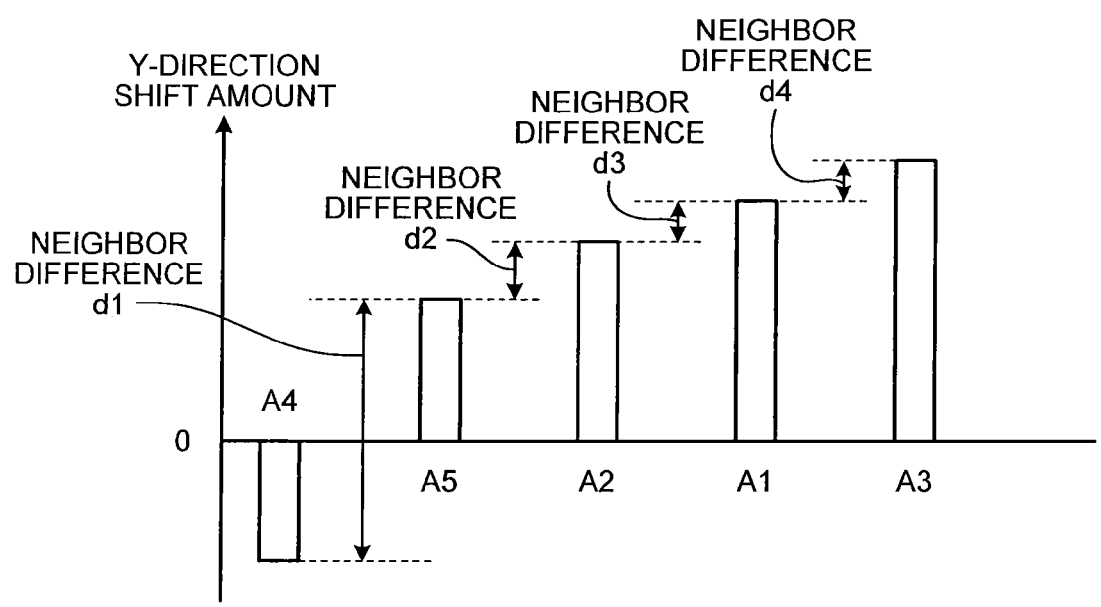
FIG. 14 is a diagram of an neighbor difference between Y-direction misalignment amounts according to the embodiment of the present invention.

FIG. 14 is a diagram illustrating neighbor differences in Y-direction misalignment amount between the reference points contained in the divided area A illustrated in FIG. 10. As illustrated in FIG. 14, a neighbor difference represents a difference in misalignment amount between neighboring reference points that are sorted according to the ascending order of the magnitude of the Y-direction misalignment amounts by using the coordinates of each of the reference points as 0.

For example, as illustrated in FIG. 14, in accordance with the Y-direction misalignment amounts, the reference points are sorted in the following order: A4, A5, A2, A1 and A3. Thereafter, a neighbor difference d1 between the neighboring reference points A4 and A5, a neighbor difference d2 between the neighboring reference points A5 and A2, a neighbor difference d3 between the neighboring reference points A2 and A1, and a neighbor difference d4 between the neighboring reference points A1 and A3 are calculated.

Each of the neighbor differences is compared with a predetermined threshold according to the order in which the reference points are sorted. When a neighbor difference is equal to or smaller than the threshold (YES at S1302), the reference point excluding unit 432b classifies the two reference points for which the neighbor difference is calculated into the same group (S1303). In other words, it is determined that the two reference points have the same tendency because the neighbor difference is small. In contrast, when the neighbor difference is larger than the threshold (NO at S1302), the reference point excluding unit 432b classifies the two reference points for which the neighbor difference is calculated into different groups (S1304).

When classifying of all reference points into groups has not been completed (NO at S1305), the reference point excluding unit 432b repeats the above-described process (S1301 to S1304). In contrast, when classifying of all reference points into groups has been completed (YES at S1305), the reference point excluding unit 432b acquires the number of reference points that belong to the group including the largest number of reference points from among the classified groups (S1306).

When the number of reference points that belong to the largest group is equal to or larger than a predetermined number (YES at S1307), the reference point excluding unit 432b that acquires the number of reference points that belong to the largest group determines that the largest group is a group that includes the reference points along the Y-direction misalignment tendency of the divided area (S1308). In contrast, when the number of reference points is smaller than the predetermined number (NO at S1307), the reference point excluding unit 432b cannot determine a group including reference points along the Y-direction misalignment tendency, thus determines that the misalignment tendency analysis failed, and thus ends the process.

Because the tendencies of most of the reference points contained in the divided area are similar, in the embodiment, if the number of reference points that belong to a group is smaller than the predetermined number, it is determined that the misalignment of those reference points does not indicate the misalignment tendency of the divided area. Accordingly, the predetermined number at S1307 is set at a relatively high ratio, e.g., 80% or more of the total number of reference points contained in the divided area, which increases the reliability of misalignment tendency analysis.

For example, it is determined that the Y-direction neighbor difference d1 illustrated in FIG. 14 is larger than the threshold and thus the reference points A4 and A5 are classified into different groups. It is determined that the neighbor difference d2 is equal to or smaller than the threshold and thus the reference points A5 and A2 are classified into the same group. Similarly, it is determined that the neighbor differences d3 and d4 are equal to or smaller than the threshold and thus the reference points A5, A2, A1 and A3 are classified into the same group.

Accordingly, the reference points in the divided area A are classified into the group to which A5, A2, A1 and A3 belong and the group to which A4 belongs and the number of reference points that belong to the largest group is 4. For example, if the predetermined number equals to 80% of the total number of reference points in the divided area A (i.e., 4), because the number of reference points that belong to the largest group is equal to or larger than the predetermined number, it is analyzed that the misalignment amounts of the reference points of the group are the misalignment tendency of the divided area A.

As described above, the misalignment amounts according to the misalignment tendency are set by performing such a process, which prevents a failure in alignment.

By classifying the reference points into groups on the basis of misalignment amount neighbor differences, it can be determined that even misalignment amounts that do not completely coincide due to small positional change of the read image are have the same misalignment tendency, which leads to a flexible misalignment tendency analysis.

In the above-described embodiment, the misalignment tendency is analyzed by using the amounts of misalignment in the Y and X directions, thus implementing a tendency analysis based the direction and magnitude of the shift. Alternatively, the tendency may be analyzed in accordance with only any one of the direction and magnitude of the shift. For the tendency analysis according to only the direction of a shift, a neighbor difference is calculated by using an angle indicating the direction of the shift.

The embodiment has been described using an exemplary case where, by classifying reference points contained in a divided area into groups on the basis of neighbor differences of X and Y direction misalignment amounts, excluded reference points that should be excluded from the reference points contained in the divided area are determined. Alternatively, an average of vectors of misalignment amounts of the reference points in the divided area may be calculated and a reference point for which a misalignment amount corresponding to the vector that is most separated from the calculated vector average is calculated may be used as an excluded reference point. Alternatively, a reference point for which a misalignment amount corresponding to a vector most separated from a calculated vector average with a predetermined interval or greater is calculated may be used as an excluded reference point.

The embodiment has been described taking an exemplary case where, when the misalignment tendency analysis fails because, for example, the misalignment tendency is not specified, the alignment unit 432c assigns the predetermined misalignment amount to the misalignment amount of the divided area. Alternatively, when the misalignment tendency analysis fails, the alignment unit 432c may assign, to the misalignment amount of the divided area, the misalignment tendency of a divided area neighboring the divided area.

Figure 15:
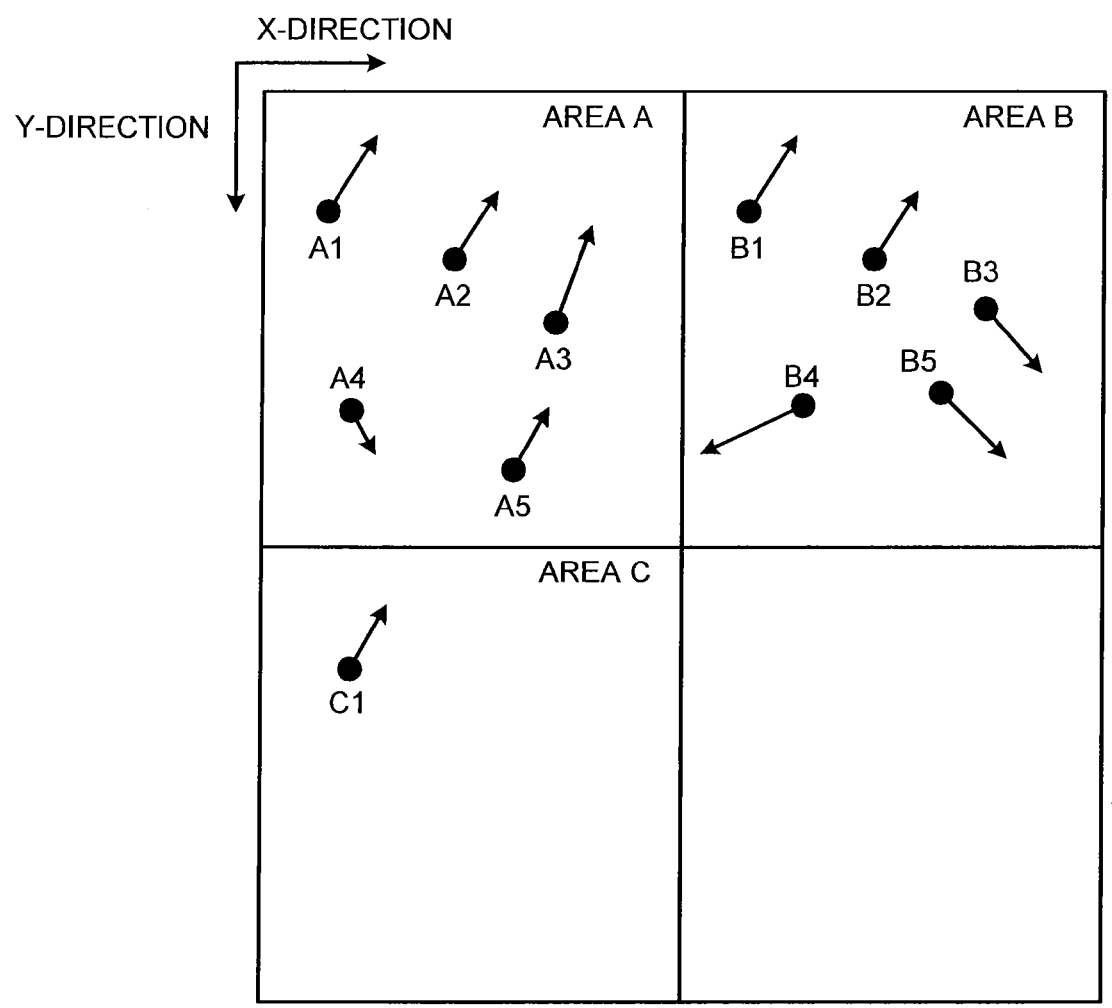
FIG. 15 is a diagram of results of calculation of amounts of misalignment of respective reference points contained in each of multiple divided areas according to the embodiment of the present invention.

FIG. 15 is a diagram illustrating results of calculation of amounts of misalignment of respective reference points contained in each of multiple divided areas A, B and C of the master image. As illustrated in FIG. 15, in the divided area B, the reference points B1 and B2 have similar misalignment tendencies, the reference points B3 and B5 have similar misalignment tendencies, and the reference point B4 has a misalignment tendency that is not similar to those of any reference point. Accordingly, it is highly likely that the misalignment tendency of the divided area B is not specified.

Furthermore, as illustrated in FIG. 15, only one reference point C1 is extracted from the divided area C and thus the reference point excluding unit 432b cannot perform a misalignment tendency analysis based on multiple reference points. Accordingly, the reference point excluding unit 432b assigns, to the misalignment amount of the divided area, a predetermined misalignment amount or the misalignment amount of the reference point C1.

In such a case, the alignment unit 432c may assign, to the misalignment amount of the divided area for which a misalignment tendency analysis has failed, the misalignment amount that is set for a divided area, neighboring the divided area for which a misalignment tendency analysis has failed, for which a misalignment tendency analysis has succeeded. For example, as illustrated in FIG. 15, because the misalignment tendency analysis has succeeded for the divided area A neighboring the divided area B, the misalignment amount of the divided area A (e.g. the average of the misalignment amounts of the reference points A1 to A3 and A5) may be assigned to the misalignment amount of the divided area B. Similarly, the misalignment amount of the divided area A neighboring the divided area C may be assigned to the misalignment amount of the divided area C. Alternatively, the reference point B4 with no similarity in misalignment to any misalignment tendency in the divided area B may be first excluded from the divided area B and the misalignment tendencies analysis may be performed on the basis of the reference points other than the reference point B4 and the reference points of adjacent divided areas.

In this manner, when the misalignment tendency cannot be analyzed by using only the reference points contained in a divided area, the alignment unit 432c can assign a misalignment amount more in conformity with the neighboring misalignment tendency than the case where a predetermined misalignment amount is simply assigned, which leads to accurate alignment. Two or more neighboring areas may be referred to and a misalignment amount of a target area may be set according to the positional relation between a target area for which a misalignment amount is set and its neighboring areas and according to changes in the misalignment amount (vector) of multiple neighboring areas to be referred to.

Figure 16:
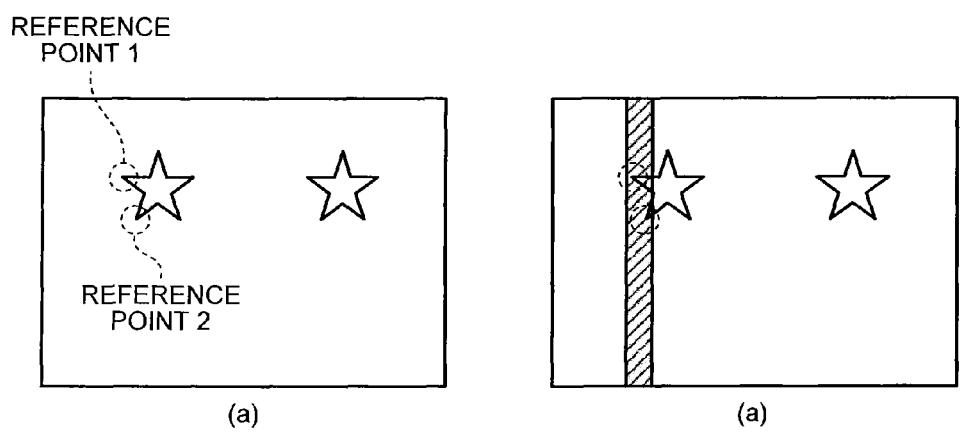
FIG. 16 illustrates an image depicting two reference points according to the embodiment of the present invention.

The reference point extraction unit 431 may extract reference points in accordance with predetermined conditions. In FIG. 16, (a) illustrates reference points 1 and 2 that are in close positions. When those reference points 1 and 2 are extracted and if a stripe (the part hatched with oblique lines) illustrated in (b) of FIG. 16 that is a defect occurs, both of the reference points 1 and 2 overlap with the defect. In such a case, an error occurs in calculation of a misalignment amount on the basis of the reference points 1 and 2, which may lead to inaccurate alignment.

Figure 17:
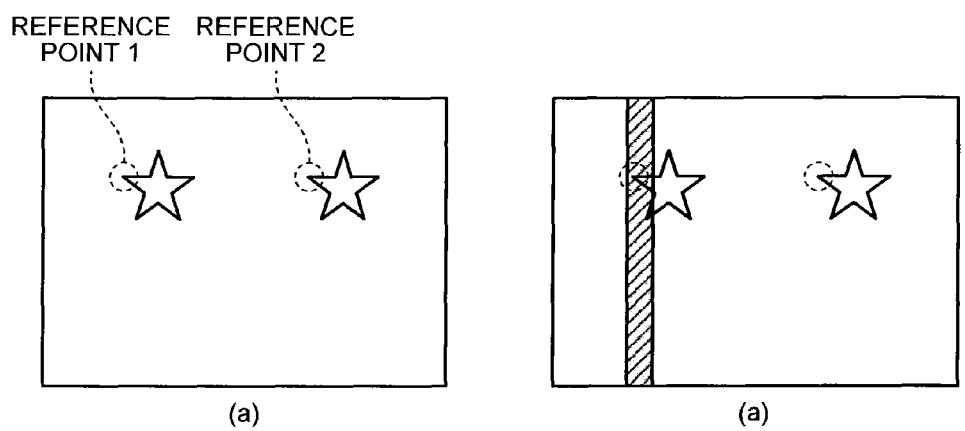
FIG. 17 illustrates an image depicting two reference points according to the embodiment of the present invention.

In contrast, FIG. 17(a) illustrates reference points 1 and 2 that are in positions more separate from each other than the case of (a) of FIG. 16. When those reference points 1 and 2 are extracted and even if a stripe (the part hatched with oblique lines) illustrated in (b) of FIG. 17 that is a defect occurs, the failure has effects only on the reference point 1 but on the reference point 2.

For this reason, when extracting reference points, the reference point extraction unit 431 may extract reference points in accordance with a conditions that, for example, reference points should be in separate positions with an interval greater than a predetermined interval, which can reduce the effects of occurrence of a defect in the read image on the alignment.

Figure 18:
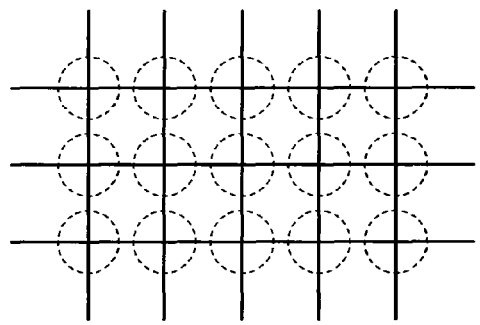
FIG. 18 illustrates an image from which dense reference points can be extracted according to the embodiment of the present invention.

FIG. 18 is a diagram illustrating where reference points can be extracted in a grid image with the same repeated patterns at small intervals. As illustrated in FIG. 18, in an image with such patterns, characteristic parts that can be extracted as reference points denoted by dotted-line circles are dense. If such a dense part is extracted as reference points, similar reference points are adjacent from one another, which may lead to erroneous association of reference points between a master image and a read image and thus lead to a failure of the alignment.

For this reason, when extracting reference points, the reference point extraction unit 431 may extract reference points, for example, according to a condition that a part with dense characteristic parts should be excluded from the reference points, which reduces a failure in alignment due to erroneous association of reference points.

The alignment processor 432 may set a misalignment amount by using a master image obtained by performing magnification changing process when the master image is generated. The magnification changing process adjusts the size of the read image and the master image that are input to the examination apparatus 4 from the reading device 400 of the print engine and accordingly, when the image is formed and output, misalignment between the images due to the effects of expansion and contract of paper is reduced. This leads to accurate alignment of each divided area.

The embodiment has been described taking an exemplary case where multiple reference points are extracted from each divided area of the master image and tendency of misalignment of the divided area is analyzed from the extracted multiple reference points, an amount of misalignment is set for each divided area on the basis of the misalignment tendency, and comparison examination is performed in consideration of the set misalignment amount. In this case, it is assumed that the misalignment amount tendencies of the reference points that are extracted from each of the divided areas are more similar than when it is determined on the basis of the whole image. For this reason, the process for determining a reference point that should be excluded on the basis of the misalignment tendency of each reference point can be performed more effectively. However, this is an example only, and the tendency of misalignment of reference points that are extracted from a whole image may be determined as a whole tendency to determine a reference point that should be excluded.

According to the embodiment, a failure can be prevented in alignment between a master image and a read image performed when a master image and a read image are compared and examined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image examination apparatus, comprising:
    a read image acquisition unit configured to acquire a read image that is generated by reading an image formed on a recording medium;
    an examination image generation unit configured to generate an examination image for examining the read image on the basis of information on the image that is to be formed and output;
    a reference point extraction unit configured to extract, from the generated examination image, multiple reference points that are used as references for alignment between the examination image and the read image;
    a misalignment information calculation unit configured to calculate information on misalignment between positions of the reference points extracted from the examination image and positions corresponding respectively to the reference points in the read image;
    a reference point excluding unit configured to exclude a reference point to be excluded from the multiple reference points, on the basis of the calculated information on misalignment;
    an alignment unit configured to perform alignment between the examination image and the read image on the basis of the reference points other than the excluded reference point; and
    an image examination unit configured to perform examination for determining whether there is a defect in the read image on the basis of a difference, used for the alignment, between the read image and the examination image.

2. The image examination apparatus according to claim 1, wherein the information on misalignment includes directions of shift of the corresponding positions in the read image with respect to the positions of the reference points extracted from the examination image.

3. The image examination apparatus according to claim 2, wherein
    the reference point excluding unit is configured to
        classify the multiple reference points into groups in accordance with the directions of shift in the information on misalignment, and
        exclude, from the multiple reference points, a reference point in a group other than a group that includes a largest number of reference points.

4. The image examination apparatus according to claim 2, wherein
    the reference point excluding unit is configured to
        calculate an average of angles indicated by the directions of shift in the information on misalignment calculated for the multiple reference points, and
        exclude a reference point to be excluded from the multiple reference points on the basis of the calculated average of the angles.

5. The image examination apparatus according to claim 4, wherein the reference point excluding unit is configured to exclude a reference point regarding which a difference between the angle indicated by the direction of shift included in the information on misalignment and the average of the angles is larger than a predetermine value.

6. The image examination apparatus according to claim 2, wherein
    the information on misalignment includes magnitudes of shift of the corresponding positions in the read image with respect to the positions of the reference points extracted from the examination image,
    the alignment unit is configured to
        calculate an average of angles indicated by the directions of shift in the misalignment information on the reference points other than the excluded reference point,
        calculate an average of the magnitudes of shift, and
        perform alignment between the examination image and the read image on the basis of the calculated average of the angles and the calculated average of the magnitudes.

7. The image examination apparatus according to claim 1, wherein the examination image generation unit is configured to perform a magnification changing process on an image when generating the examination image.

8. The image examination apparatus according to claim 1, wherein the reference point extraction unit is configured to extract reference points in positions with an interval equal to or larger than a predetermined interval.

9. The image examination apparatus according to claim 1, wherein
    the reference point extraction unit is configured to
        divide the examination image into predetermined areas, and
        extract multiple reference points from each of the areas,
    the reference point excluding unit is configured to exclude the reference point to be excluded from the multiple reference points on the basis of the information on misalignment that is calculated for the multiple reference points, for each of the areas, and the alignment unit is configured to perform alignment between the examination image and the read image on the basis of the reference points other than the excluded reference point, for each of the areas.

10. An image examination system, comprising:

a read image acquisition unit configured to acquire a read image that is generated by reading an image formed on a recording medium;

an examination image generation unit configured to generate an examination image for examining the read image on the basis of information on the image that is to be formed and output;

a reference point extraction unit configured to extract, from the generated examination image, multiple reference points that are used as references for alignment between the examination image and the read image;

a misalignment information calculation unit configured to calculate information on misalignment between positions of the reference points extracted from the examination image and positions corresponding respectively to the reference points in the read image;

a reference point excluding unit configured to exclude a reference point to be excluded from the multiple reference points, on the basis of the calculated information on misalignment;

an alignment unit configured to perform alignment between the examination image and the read image on the basis of the reference points other than the excluded reference point; and an image examination unit configured to perform examination for determining whether there is a defect in the read image on the basis of a difference, used for the alignment, between the read image and the examination image.

11. An image examination method, comprising:

acquiring a read image that is generated by reading an image formed on a recording medium;

generating an examination image for examining the read image on the basis of information on the image that is to be formed and output;

extracting, from the generated examination image, multiple reference points that are used as references for alignment between the examination image and the read image;

calculating information on misalignment between positions of the reference points extracted from the examination image and positions corresponding respectively to the reference points in the read image;

excluding a reference point to be excluded from the multiple reference points, on the basis of the calculated information on misalignment;

performing alignment between the examination image and the read image on the basis of the reference points other than the excluded reference point; and performing examination for determining whether there is a defect in the read image on the basis of a difference, used for the alignment, between the read image and the examination image.

* * * * *